United States Patent
Okawa (10) Patent No.: US 10,185,118 B2
(45) Date of Patent: Jan. 22, 2019

(54) LENS CONTROL APPARATUS AND LENS CONTROL METHOD

(71) Applicant: Olympus Corporation, Hachioji-shi, Tokyo (JP)

(72) Inventor: Satoshi Okawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 63 days.

(21) Appl. No.: 15/596,162

(22) Filed: May 16, 2017

(65) Prior Publication Data

US 2017/0343766 A1 Nov. 30, 2017

(30) Foreign Application Priority Data

May 24, 2016 (JP) ................... 2016-103336

(51) Int. Cl.
| | |
|---|---|
| *G02B 7/04* | (2006.01) |
| *G02B 7/14* | (2006.01) |
| *G02B 7/08* | (2006.01) |
| *G02B 7/10* | (2006.01) |
| *G03B 3/10* | (2006.01) |

(52) U.S. Cl.
CPC ............ *G02B 7/04* (2013.01); *G02B 7/08* (2013.01); *G02B 7/102* (2013.01); *G02B 7/14* (2013.01); *G03B 3/10* (2013.01)

(58) Field of Classification Search
CPC ........................................................ G02B 7/04
USPC ........................................................ 359/825
See application file for complete search history.

(56) References Cited

U.S. PATENT DOCUMENTS

2012/0328277 A1* 12/2012 Nakata ............... G03B 3/10
                                                                396/131
2016/0119533 A1   4/2016 Okawa

\* cited by examiner

*Primary Examiner* — James Jones
(74) *Attorney, Agent, or Firm* — John C. Pokotylo; Pokotylo Patent Services (57) ABSTRACT

A lens control apparatus having a focusing lens capable of moving in an optical axis direction provided within a lens barrel including a photographing lens, comprising; a ring rotatably disposed to the lens barrel; a memory storing a first relationship between a rotation angle of the ring and a value relating to a photographing distance corresponding to a first photographing distance area and a second relationship between a rotation angle of the ring and a value relating to a photographing distance corresponding to a second photographing distance area on a shorter distance side than the first photographing distance area; and a controller controlling a position in an optical axis direction of the focusing lens by selecting the first relationship or the second relationship in accordance with a rotation angle of the ring and calculating a value relating to a photographing distance in accordance with a rotation angle of the ring.

12 Claims, 7 Drawing Sheets

LENS CONTROL APPARATUS AND LENS CONTROL METHOD

CROSS-REFERENCE TO RELATED APPLICATIONS

Benefit is claimed, under 35 U.S.C. § 119, to the filing date of prior Japanese Patent Application No. 2016-103336 filed on May 24, 2016. This application is expressly incorporated herein by reference. The scope of the present invention is not limited to any requirements of the specific embodiments described in the application.

BACKGROUND OF THE INVENTION

1. Field of the Invention

The present invention relates to a lens control apparatus and a lens control method that adjust the position of a focusing lens based on a rotation position of a ring member provided in a lens barrel.

2. Description of Related Art

An imaging device that performs the rotation operation of a ring member provided in a lens barrel and moves a focusing lens so as to be focused at a distance specified by this operation has been proposed (see Japanese Patent Laid-Open No. 2015-011315 (hereinafter, referred to as Patent Literature 1)). With this imaging device, it is possible to perform focusing from infinity to the shortest distance by performing the rotation operation of the ring member from one endpoint to the other end point.

In the case of a photographing lens having a zoom mechanism, a photographing lens of a type whose shortest photographing distance changes depending on the focal length is present. The imaging device disclosed in the above-described Patent Literature 1 does not take into consideration the change in the shortest photographing distance.

SUMMARY OF THE INVENTION

An object of the present invention is to provide a lens control apparatus and a lens control method capable of securing favorable operability without giving a photographer a feeling of unnaturalness even in the case of a photographing lens whose shortest photographing distance changes.

A lens control apparatus according to a first aspect of the present invention, comprising: a focusing lens capable of moving in an optical axis direction provided within a lens barrel including a photographing lens; a ring rotatably disposed to the lens barrel within an angle range between a first end point and a second end point; a memory that stores a first relationship between a rotation angle of the ring and a value relating to a photographing distance corresponding to a first photographing distance area and a second relationship between a rotation angle of the ring and a value relating to a photographing distance corresponding to a second photographing distance area on a shorter distance side than the first photographing distance area; a rotation angle detector that detects a rotation angle of the ring; and a controller that controls a position in an optical axis direction of the focusing lens by selecting the first relationship or the second relationship in accordance with a rotation angle of the ring detected by the rotation angle detector and calculating a value relating to a photographing distance in accordance with a rotation angle of the ring.

A lens control method according to a second aspect of the present invention is a lens control method of an imaging device having a focusing lens capable of moving in an optical axis direction provided within a lens barrel including a photographing lens, a ring rotatably disposed to the lens barrel within an angle range between a first end point and a second end point, a memory that stores a first relationship between a rotation angle of the ring and a value relating to a photographing distance corresponding to a first photographing distance area and a second relationship between a rotation angle of the ring and a value relating to a photographing distance corresponding to a second photographing distance area on a shorter distance side than the first photographing distance area, the lens control method comprising: detecting a rotation angle of the ring; and controlling a position in an optical axis direction of the focusing lens by selecting the first relationship or second relationship in accordance with a rotation angle of the ring and calculating a value relating to a photographing distance in accordance with a rotation angle of the ring.

DETAILED DESCRIPTION OF THE PREFERRED EMBODIMENTS

Hereinafter, an exemplary application to a digital camera (hereinafter, abbreviated to a "camera") will be explained as an embodiment of the present invention. This camera has an imaging section, which converts a subject image into image data, and produces, based on the converted image data, a live-view display of the subject image on a display section disposed on the back side of the main body. A user determines a composition and shutter timing by observing the live-view display. At the time of the release operation, image data is stored in a storage medium. When a reproduction mode is selected, it is possible to reproduce and display image data stored in the storage medium on the display section.

Further, the camera according to the present embodiment has a focusing lens (focus lens 11b) capable of moving in an optical axis direction within a lens barrel including a photographing lens. On the outer circumference of the lens barrel, a ring member (distance ring 51) capable of rotating within an angle range between a first endpoint and a second endpoint is disposed. This ring member or the lens barrel is provided with distance scales (see FIG. 3B) and when an RF mode is set, by rotating the ring member to align the distance scale with an index, the controller controls movement of the focusing lens so that focus is set at a specified distance.

Figure 1:
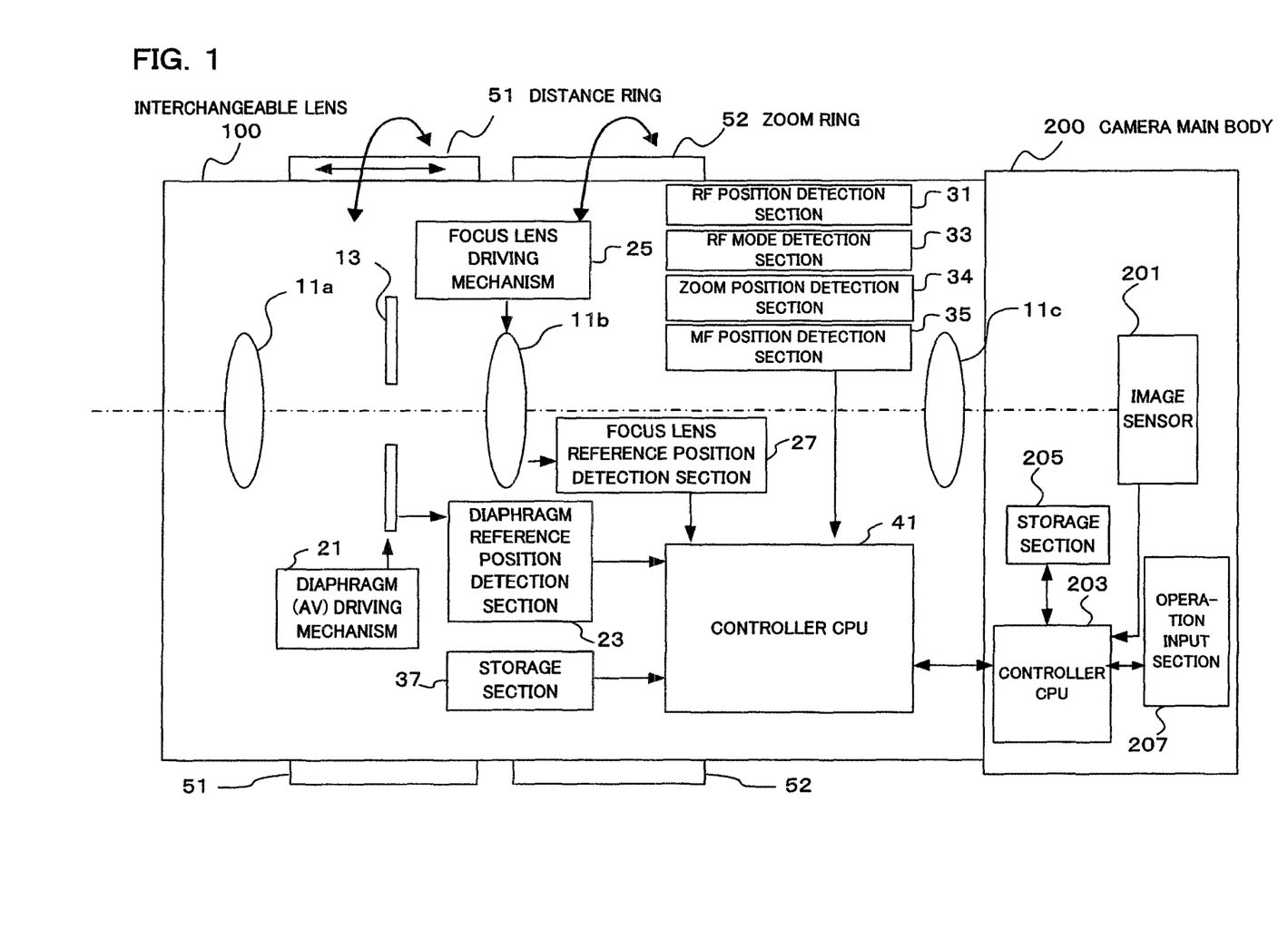
FIG. 1 is a block diagram illustrating a configuration of a camera according to an embodiment of the present invention.
Figure 2:
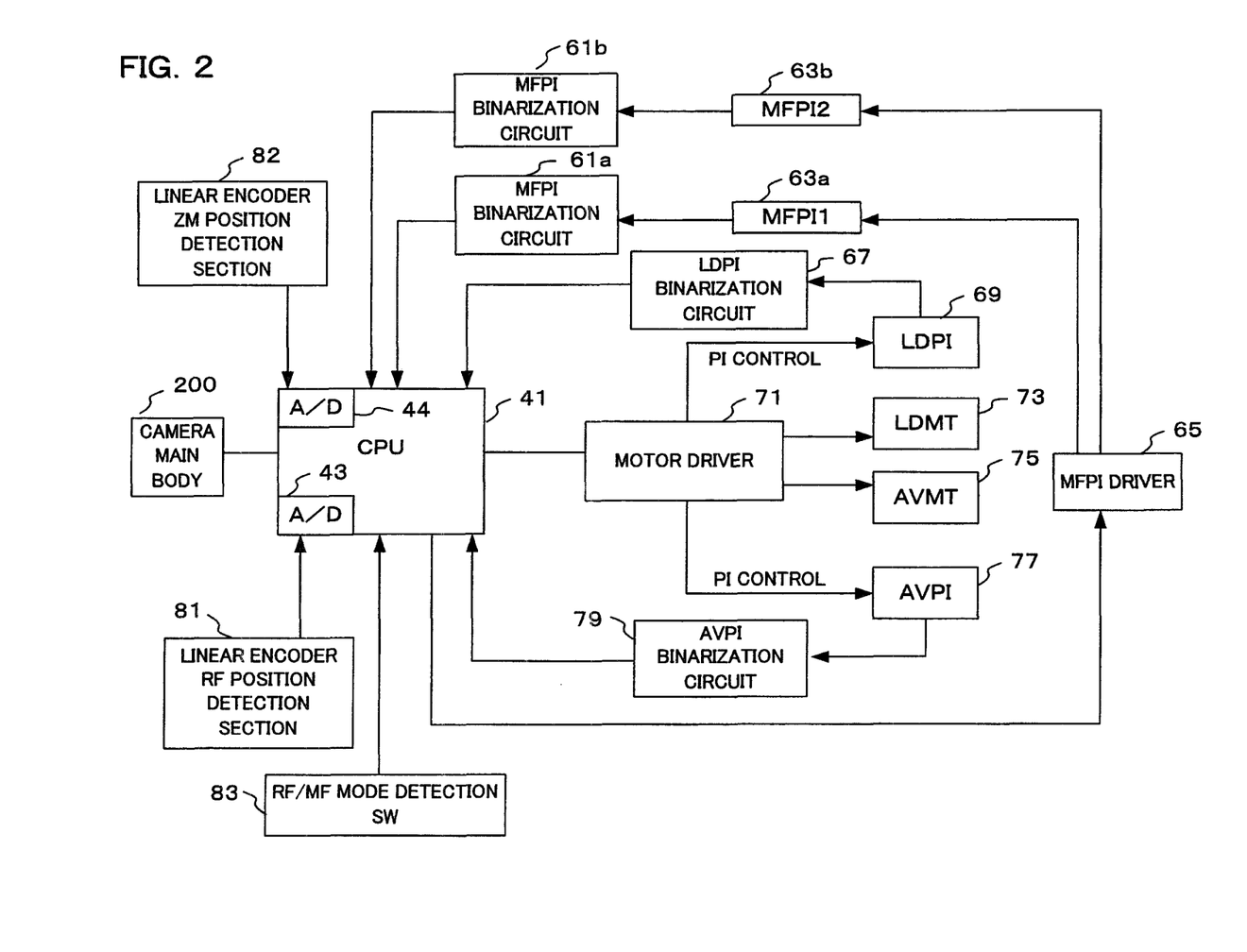
FIG. 2 is a block diagram illustrating mainly an electrical configuration of a camera according to an embodiment of the present invention.

FIG. 1 is a block diagram illustrating a configuration of a camera according to an embodiment of the present invention and FIG. 2 is a block diagram illustrating mainly an electrical configuration in this camera. This camera includes an interchangeable lens 100 and a camera main body 200 to and from which this interchangeable lens 100 can be attached and detached. However, of course it may also be possible to integrally configure the lens barrel and the camera main body.

Within the interchangeable lens 100, a photographing lens 11 including lenses 11a to 11c is provided. The photographing lens 11 forms a subject image d. Among these lenses, the focus lens 11b is a lens for focusing, and can move in an optical axis direction by a focus lens driving mechanism 25. The focus lens driving mechanism 25 has a focus lens driving actuator (driving motor) and a focus lens driving circuit. Further, part of the lenses 11a to 11c is a zoom lens to change the focal length. Consequently, within the interchangeable lens 100, a zoom lens groups is provided. The focus lens 11b functions as a focusing lens capable of moving in an optical axis direction provided within the lens barrel including the photographing lens.

Further, a focus lens reference position detection section 27 outputs a detection signal to a CPU 41, which is a controller, when the focus lens 11b reaches the reference position. For reference position detection, a photo interrupter (PI) is used. Note that, in the present embodiment, the position of the focus lens 11b is detected based on the number of applied pulses (Pls number) applied to the focus lens actuator (stepping motor is used) from when the reference position is detected.

Between the lenses 11a and 11b, a diaphragm 13 is disposed. The aperture diameter of the diaphragm 13 is changed by a diaphragm driving mechanism 21 and changes a subject light quantity passing through the photographing lens 11. The diaphragm driving mechanism 21 has a diaphragm actuator, a diaphragm driver circuit, and so on. As the actuator, a stepping motor is used and fine control is performed by micro-step driving. Note that, of course, it may also be possible to dispose the diaphragm 13 other than between the lenses 11a and 11b.

When the aperture diameter of the diaphragm reaches a reference position, a diaphragm reference position detection section 23 outputs a detection signal to the CPU 41. The reference position of the diaphragm position is acquired by the diaphragm reference position detection section 23 and the diaphragm position is managed by relative position detection. In the present embodiment, the relative position is detected by the number of pulses applied to the stepping motor, but it may also be possible to detect the relative position by a method other than this. Further, the reference position is detected by the photo interrupter (PI), but it may also be possible to detect the reference position by a sensor other than the photo interrupter.

Figure 3A:
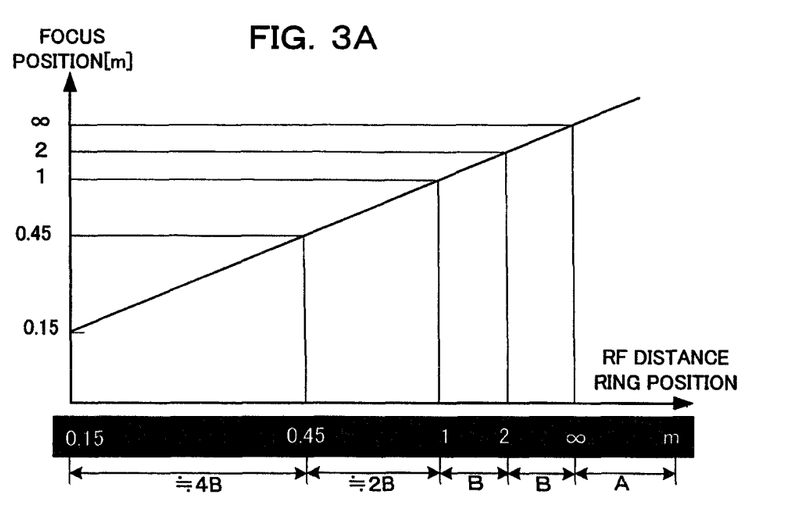
FIG. 3A and FIG. 3B are graphs representing relationships between a rotation position of a distance ring and a focus position of a focus lens in a camera according to an embodiment of the present invention.
Figure 3B:
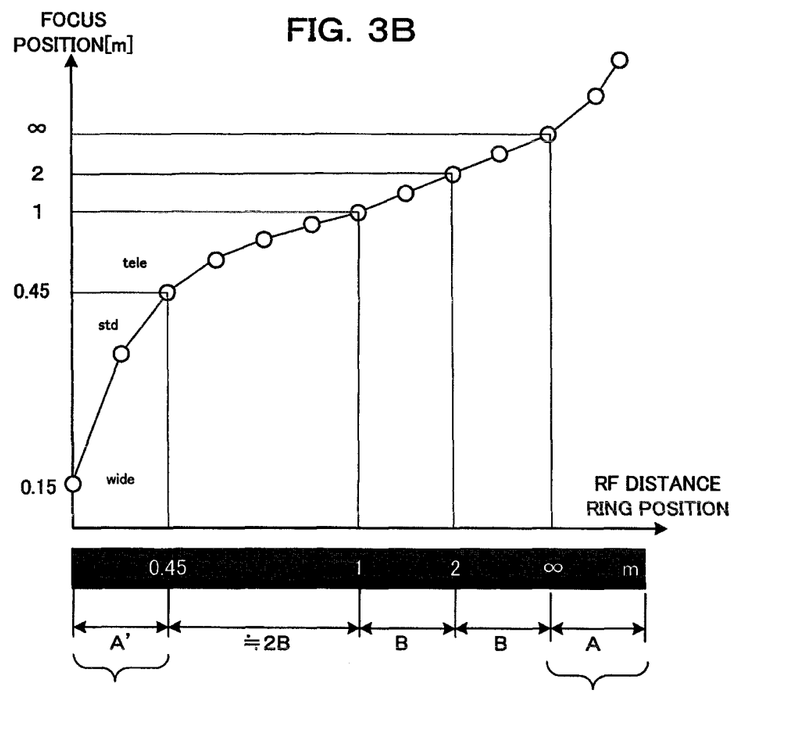
Figure 4:
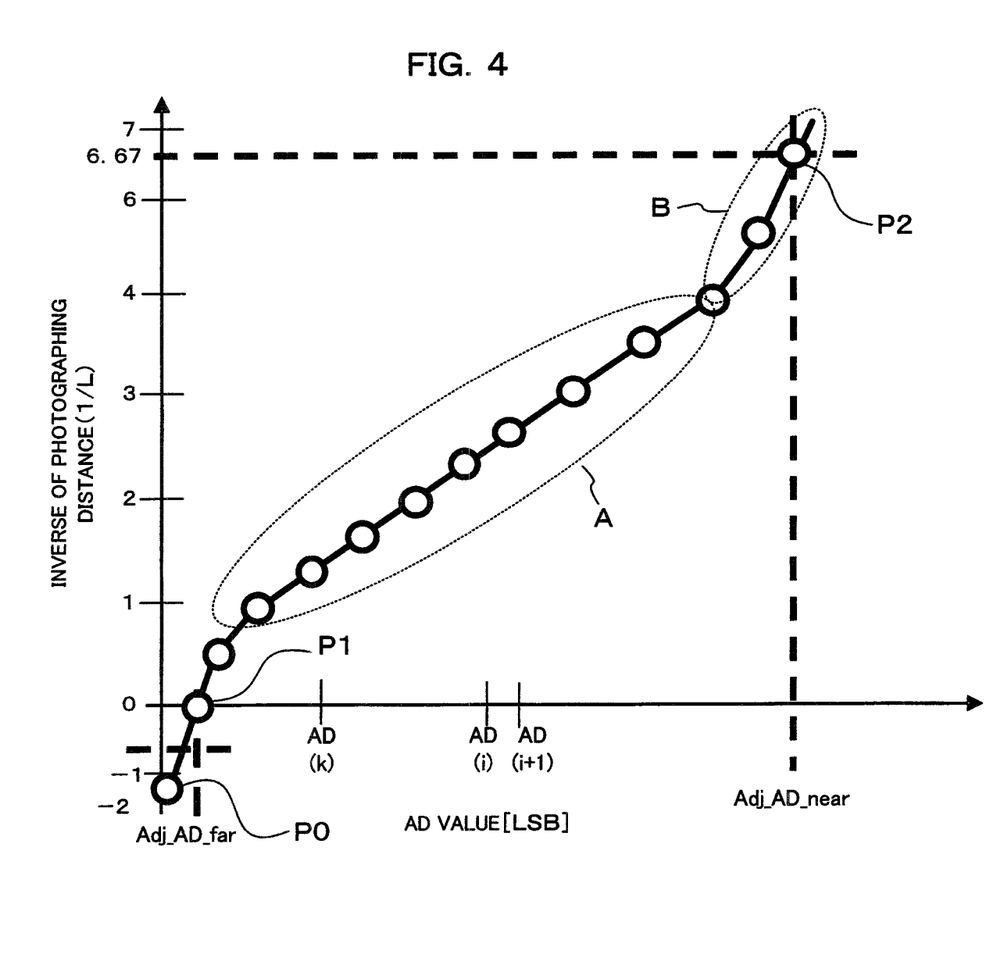
FIG. 4 is a graph representing a relationship between an AD-converted value of a rotation position of a distance ring and a photographing distance (1/L) in a camera according to an embodiment of the present invention.

On the outer circumference of the interchangeable lens 100, the distance ring 51 is disposed. It is possible for the distance ring 51 to freely slide within a predetermined range in the optical axis direction of the photographing lens 11 as well as freely rotating around the outer circumference of the interchangeable lens 100. This distance ring 51 is set at an MF (Manual Focus) position when slid to the subject side and set at an RF (Range Focus) position when slid to the main body side. By the slide of the distance ring 51, switching is performed between the RF mode and the MF mode (non-RF mode). The detection of the mode is performed by an RF mode detection section 33. Further, the distance ring 51, when set to the RF mode, is configured to be rotatable between a short distance and infinity. As illustrated in FIG. 3B, FIG. 4, and so on, it is possible for the distance ring 51 to rotate to a shorter distance side than the short distance and to rotate to a further infinity side than the infinity.

The distance ring 51 functions as a ring that is rotatably disposed to the lens barrel within an angle range between a first end point and a second end point. Further, the distance ring 51 and a slide mechanism thereof function as a ring position switch mechanism that switches the ring to a plurality of positions in the optical axis direction. Further, the distance ring 51 and the slide mechanism function as a ring position switch mechanism that switches a control mode of performing control in accordance with a relative rotation position of the ring and a control mode of performing control in accordance with an absolute rotation position of the ring according to a plurality of positions in the optical axis direction.

The MF mode is a mode in which a user performs focusing in accordance with the rotation direction and the rotation amount of the distance ring 51. On the other hand, the RF mode is a mode of focusing at a distance specified by the distance ring 51. That is, the MF mode and the RF mode are both manual focusing, but differ in that the distance ring 51 specifies a relative distance in the MF mode and specifies an absolute distance in the RF mode.

By the slide of the distance ring 51, the RF mode is set and when the distance ring 51 is rotated, an RF position detection section 31 detects the rotation position. The RF position detection section 31 detects the absolute position of the rotation position of the distance ring 51. The focus lens driving mechanism 25 drives the focus lens 11b to the photographing distance in accordance with the rotation position of the distance ring 51 according to a control signal from the CPU 41. The RF position detection section 31 functions as a rotation angle detector that detects a rotation angle of the ring member.

The RF mode detection section 33 detects which of the MF position and the RF position the distance ring 51 is set at based on an output of an RF/MF mode detection switch 83 (see FIG. 2).

An MF position detection section 35 detects the rotation direction and the rotation amount of the distance ring 51 when the distance ring 51 is set at the MF position. The MF position detection section 35 has a first MFPI 63a, a second MFPI 63b, a first MFPI binarization circuit 61a, a second MFPI binarization circuit 61b, and so on, to be described later. When the distance ring 51 rotates, light-shielding blades located inside the distance ring 51 rotate integrally. The rotation of the light-shielding blades is counted by the photo interrupter (PI) and based on the count results by the MF position detection section 35, the focus lens 11b is driven. Note that, of course, it may also be possible to detect the rotation direction and the rotation amount of the distance ring 51 by a sensor other than the photo interrupter.

On the outer circumference of the interchangeable lens 100 and on the side closer to the main body than the distance ring 51, a zoom ring 52 is provided rotatably. The photographing lens is a zoom lens with a variable focal length and a user can perform zooming by manually rotating the zoom ring 52.

A zoom position detection section 34 detects the absolute value of the rotation position of the zoom ring 52 and outputs it to the CPU 41. As will be described later, the zoom position detection section 34 has a linear encoder ZM position detection section 82 (see FIG. 2) and the output of the linear encoder ZM position detection section 82 is AD-converted by an A/D converter 44 within the CPU 41 and the AD-converted value indicates a focal length. The zoom position detection section 34 functions as a zoom position detector that detects the zoom position of the zoom lens group within the lens barrel.

A storage section 37 has an electrically rewritable nonvolatile memory or the like, such as a flash memory, and stores programs for the CPU 41, various kinds of information, such as optical data of the interchangeable lens, various adjustment values, various parameters, and so on.

Further, the storage section 37 stores a relationship between the rotation angle of the distance ring 51 and the photographing distance in an AD-photographing distance (1/L) table when the RF mode is set (see FIG. 4). The characteristics of this relationship are made to differ between a shorter distance side and a longer distance side than a predetermined distance. This relationship will be described later by using FIG. 3A, FIG. 3B, and FIG. 4. Further, the storage section 37 stores an optical short distance pulse table indicating an optical short distance for each focal length (for example, see S21 in FIG. 5C).

Figure 5A:
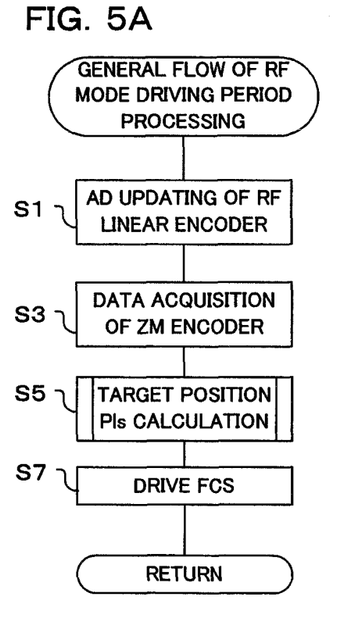
FIGS. 5A to 5C are flowcharts illustrating the operation of a camera in an embodiment of the present invention.
Figure 5B:
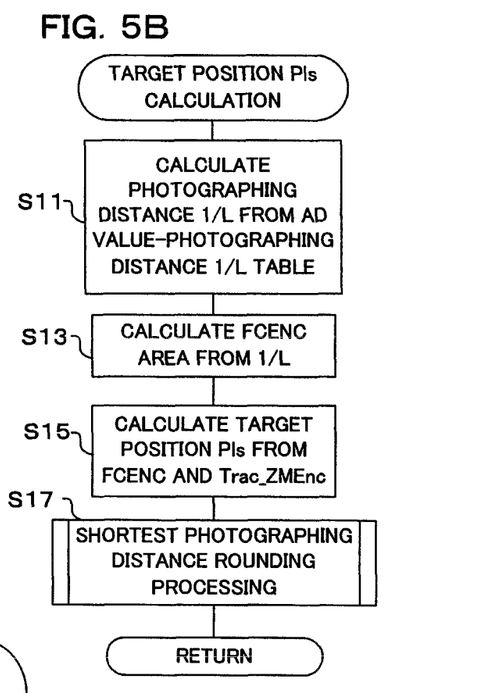

The storage section 37 functions as a memory that stores a first relationship between a rotation angle of the ring and a value relating to the photographing distance corresponding to a first photographing distance area (first subject distance) and a second relationship between a rotation angle of the ring and a value relating to the photographing distance corresponding to a second photographing distance area (second subject distance) on a shorter distance side than the first photographing distance area (for example, see a first relationship X and a second relationship Y in FIGS. 4 and S11 in FIG. 5B). In the above-described second relationship, the amount of change in the value relating to the photographing distance to the rotation angle of the ring is larger than that in the first relationship (for example, see FIG. 3B). The above-described memory stores a plurality of the above-described second relationships in accordance with the zoom position. Further, in the plurality of the second relationships, the shortest distance at which focusing by the focusing lens is possible is different depending on the zoom position.

The CPU 41, which is a controller, performs control within the interchangeable lens 100 in response to the control command from the camera main body 200 according to programs stored in the storage section 37 described previously. The CPU 41 receives detection signals from the diaphragm reference position detection section 23, the focus lens reference position detection section 27, the RF position detection section 31, the RF mode detection section 33, the zoom position detection section 34, and the MF position detection section 35 and outputs control signals to the focus lens driving mechanism 25 and the diaphragm driving mechanism 21.

Further, the CPU 41 functions as a controller that controls the position in the optical axis direction of the focusing lens by selecting the first relationship or the second relationship in accordance with the rotation angle of the ring member detected by the rotation angle detection section and calculating the value relating to the photographing distance (subject distance) in accordance with the rotation angle of the ring member (see S11 in FIG. 5B). This controller performs control of the position in the optical axis direction of the focusing lens in the case where the ring is set at a predetermined position by the ring position switch section. Further, this controller performs control of the position in the optical axis direction of the focusing lens in the case where the control mode of performing control in accordance with the absolute rotation position of the ring is selected.

Within the camera main body 200, an image sensor 201, a CPU 203 within the controller, a storage section 205, and an operation input section 207 are disposed. The image sensor 201 is disposed in the vicinity of the image forming position of the photographing lens 11 and photoelectrically converts a subject image formed on the photographing lens 11 and outputs image data. Further, the CPU 203 communicates with the CPU 41 within the interchangeable lens 100. The storage section 205 has programs to control the entire camera system and the CPU 203 performs entire control of the camera system. The operation input section 207 has various operation members, such as a release button and a cross button. Further, image data acquired by the image sensor 201 is stored in the storage medium and a live-view image and a reproduced image are displayed on the display section.

Next, by using FIG. 2, details of the electrical configuration will be explained. As described previously, it is possible for the CPU 41 to communicate with the camera main body 200. Further, the CPU 41 is connected to a motor driver 71 which drives an LDPI 69, an LDMT 73, an AVMT 75, and an AVPI 77.

The LDPI 69 is a photo interrupter for reference position detection of the focus lens 11*b* and the output of the LDPI 69 is connected to an LDPI binarization circuit 67. The LDPI 69 and the LDPI binarization circuit 67 correspond to the focus lens reference position detection section 27 described previously.

The LDMT 73 is an LD motor (lens driving motor) and functions as a focus lens actuator within the focus lens driving mechanism 25 described previously. As the LD motor, in the present embodiment, a stepping motor is employed, but of course it may also be possible to use another motor, for example, a common VCM (Voice Coil Motor). The AVMT 75 is a diaphragm motor and functions as a diaphragm actuator within the diaphragm driving mechanism 21 described previously.

The AVPI 77 is a photo interrupter for reference position detection of the diaphragm 13 and the output of the AVPI 77 is connected to an AVPI binarization circuit 79. The AVPI 77 and the AVPI binarization circuit 79 correspond to the diaphragm reference position detection section 23 described previously.

An MFPI driver 65 is a driver of the first MFPI 63*a* and the second MFPI 63*b* to detect the rotation of the distance ring 51 in the case where the distance ring 51 is slid to the MF position. Each of the first and second MFPIs 63*a* and 63*b* has an optical sensor and a light-emitting section, and is configured so that the light-shielding blade can pass between the optical sensor and the light-emitting section. The MFPI driver 65 turns on or off the light-emitting section of the first and second MFPIs 63*a* and 63*b* in accordance with instructions from the CPU 41.

The first MFPI (in FIG. 2, abbreviated to "MFPI 1") 63*a* and the second MFPI (in FIG. 2, abbreviated to "MFPI 2") 63*b* are provided at positions, respectively, a little bit distant from each other along the rotation direction of the light-shielding blade. The installation positions of the first MFPI 63*a* and the second MFPI 63*b* are set so that the position relationship therebetween is such that the phase difference between the two signals from the MFPI 63*a* and MFPI 63*b* is 90 degrees. When the distance ring 51 is operated so as to rotate by a user, the light-shielding blade moves in an interlocked manner with this, and by this light-shielding blade, the MFPI 63 enters the light-shielded state and the light-transmitted state and the two pulse signals whose phases are different by 90 degrees are output from the first and second MFPIs 63*a* and 63*b*.

The output of the first MFPI 63*a* is connected to the first MFPI binarization circuit 61*a* and binarized by the first MFPI binarization circuit 61*a*. Similarly, the output of the second MFPI 63*b* is connected to the second MFPI binarization circuit 61*b* and binarized by the second MFPI binarization circuit 61*b*. The first and second MFPI binarization circuits 61*a* and 61*b*, the first and second MFPIs 63*a* and 63*b*, and the MFPI driver 65 correspond to the MF position detection section 35 described previously.

The binarized pulse signal from the MFPI 63 is output to the CPU 41 and a two-phase counter within the CPU 41 counts the pulse corresponding to the rotation speed of the distance ring 51 and also detects the rotation direction.

A linear encoder RF position detection section 81 is a linear encoder to detect the absolute value (rotation angle) in the rotation direction of the distance ring 51 in the case where the distance ring 51 is slid to the RF position. The linear encoder RF position detection section 81 is provided so that the detection contact point moves in accordance with the rotation of the distance ring 51 and outputs an analog signal in accordance with the absolute position in the rotation direction of the distance ring 51. The angle detection is performed by, for example, detecting the rotation angle relative to the movement position of the distance ring 51 with the output of the linear encoder RF position detection section 81 at the position where the AD value represented by the horizontal axis in FIG. 4 is 0 as an angle reference.

Within the CPU 41, an A/D converter 43 is provided and the A/D converter 43 converts an analog signal from the linear encoder RF position detection section 81 into a digital signal. The A/D-converted value by the A/D converter 43 indicates the photographing distance (absolute distance) specified by a user. The linear encoder RF position detection section 81 and the A/D converter 43 correspond to the RF position detection section 31 described previously.

The linear encoder ZM position detection section 82 is an encoder to detect the absolute value in the rotation direction of the zoom ring 52. The linear encoder ZM position detection section 82 is provided along the rotation direction of the zoom ring 52 and outputs an analog signal in accordance with the absolute position in the rotation direction of the zoom ring 52. Within the CPU 41, the A/D converter 44 is provided and the A/D converter 44 converts an analog signal from the linear encoder ZM position detection section 82 into a digital signal. The A/D-converted value by the A/D converter 44 indicates the focal length set by a user.

The RF/MF mode detection switch (SW) 83 is a switch to detect whether the distance ring 51 is set to the RF mode or the MF mode. This RF/MF mode detection SW 83 detects the position in the optical axis direction of the distance ring 51 and turns on or off at the time of the RF mode setting or at the time of the MF mode setting and this on/off state is output to the CPU 41.

Next, by using FIGS. 3A and 3B and FIG. 4, focusing at the time of the RF mode setting in the present embodiment will be explained. FIG. 3A and FIG. 3B illustrate relationships between the position set by the distance ring and the focus position, where FIG. 3A relates to a conventional apparatus and FIG. 3B relates to the apparatus according to the present embodiment. In FIG. 3A and FIG. 3B, the horizontal axis represents the position of the distance ring 51 (RF distance ring) and the vertical axis represents the focus position of a focus lens. Further, figures and the like described in white in a black belt indicate the photographing distance displayed on the distance ring 51. That is, the ring member (for example, the distance ring 51) is provided with of photographing distance indications disposed corresponding to the indexes provided on the lens barrel.

At the time of the RF mode setting, a user specifies a photographing distance by performing the rotation operation of the distance ring 51 and the controller adjusts the position of the focus lens 11*b* so that focus is set at a specified photographing distance. In general, in the lens barrel having a zoom mechanism, the shortest photographing distance changes depending on the focal length position.

In order to seta photographing distance in the RF mode, the distance ring 51 is provided with markings of distance scales. If the display position of the marking changes depending on the focal length, there is no problem, but because of being a marking, it is not easy to change the display position. In order to solve this, it is considered to produce a display by integrating all the shortest photographing distances into the shortest distance on the longer distance side.

For example, in the case of a zoom lens whose shortest photographing distance when the shortest distance is on the wide angle side (wide side, the focal length is the shortest focal length, for example, the focal length of 12 mm) is 15 cm and whose shortest photographing distance when the shortest distance is on the telephoto side (tele side, the focal length is the longest focal length, for example, the focal length of 100 mm) is 45 cm, the shortest photographing distance is set uniformly to 45 cm irrespective of the focal length. This method enables the indications of the distance scales to have a feeling of uniformity. However, on the wide angle side, in the case where the RF mode is set despite that it is possible to perform photographing on the shorter distance side, there occurs trouble that it is not possible to perform photographing at a distance on the shorter distance side.

Consequently, in the present embodiment, in accordance with the detected focal length (ZM position), control is performed as follows.

(1) In the case where the distance scale is at a distance longer than the shortest photographing distance of each ZM position (distance scale≥shortest photographing distance), the focus is driven to the distance scale position.

(2) In the case where the distance scale is at a distance shorter than the shortest photographing distance of each ZM position (distance scale<shortest photographing distance), the focus is driven to the shortest photographing distance.

Normally, the distance scales are marked so that 1/L is linear in the case where the photographing distance is taken to be L as illustrated in FIG. 3A. For example, when the width of the distance between infinity (∞) and 2 m is B on the distance scales, the width of the distance between 2 m and 1 m (=2 m to 1 m), which is ½ of 2 m, is also B. Further, the width of the distance between 1 m, which is ½ of 1 m, and 0.5 m (=1 m to 0.5 m) is 2B. Similarly, the width between 0.5 m and 0.25 m is 4B. However, in FIG. 3A, the distance between 0.15 m and 0.45 m is approximately described as 4B.

As described above, the normal distance scales are indicated so that the inverse of the photographing distance L becomes linear with respect to the rotation angle of the distance ring. Because of this, the interval between the indication graduations of the distance ring becomes larger on the short distance side. Consequently, problems of (a) to (c) described below occur.

(a) Because the distance scales are indicated so that the inverse of the distance L becomes linear with respect to the rotation angle of the distance ring, on the short distance side on which the interval becomes larger, the resolution becomes insufficient. This problem can be solved if the resolution can be increased on the short distance side. However, the resolution is determined by the number of bits when the analog measurement value of the rotation angle of the distance ring is AD-converted and it is not possible to easily change the resolution.

(b) Because the distance scales are indicated so that the inverse of the distance L becomes linear, the range of the graduations on the short distance side becomes wider, and therefore, the balance of the distance scales is worsened. In the example illustrated in FIG. 3A, the rotation angle is about 100° and the ratio between the widths on the shortest distance side is large and the balance is poor in terms of design.

(c) In the case where the focal length is operated to the telephoto side, the area on the shorter distance side than the shortest distance at this time becomes large. Because of this, when a user performs the distance setting by setting the RF mode, the user is given a feeling of unnaturalness.

Consequently, in the present embodiment, the above-described problems are solved as follows. As to (a) described above, the slope of the line indicating the relationship of the focus position of the focus lens with respect to the distance specified by the distance ring 51 (RF distance ring) is increased on the short distance side compared to that on the long distance side. In the example illustrated in FIG. 3B, the slope between 0.15 m and 0.45 m of the photographing distance (RF distance ring position) is increased than the slope between 0.45 m and ∞. That is, by increasing the slope on the short distance side, the excessive resolution is no longer required on the short distance side.

As to (b) described above, because the slope on the short distance side is increased as described above, the distance scale range on the short distance side becomes narrow and on the other hand, the distance scale range on the long distance side becomes wide. Because of this, the balance at the time of use when a user specifies a distance in the RF mode is improved. In the example illustrated in FIG. 3B, the balance is improved by matching the width of an area A on the right side of infinity (∞) with the width of an area A' on the left side nearer than the near side (0.45 m).

As to (c) described above, because the slope on the short distance side is increased as described above, the range of the distance scales on the short distance side that cannot be used on the telephoto side becomes narrow. In the example illustrated in FIG. 3B, the slope is changed at the shortest distance (in this example, 0.45 m) on the telephoto side (the longest focus side tele). Because of this, the range on the shorter distance side than the distance (0.45 m) is narrow and when a user sets the RF mode and performs the distance setting, the user is not given a feeling of unnaturalness. Note that, different from the infinity side, on the short distance side, the range is one in which a user can adjust focus by moving the camera back and forth, and therefore, there is no practical problem.

As described above, in the present embodiment, in the vicinity of the shortest distance when the focal length is set at the longest focal length, the slope of the line indicating the relationship between the position (rotation angle) of the distance ring 51 (RF distance ring) to specify a photographing distance and the focus position of the focus lens is changed. Because of this, it is possible to solve the problems (a) to (c) described above.

Note that, in the case where the boundary between the short distance side and the long distance side is one point (in the example illustrated in FIG. 3B, 0.45 m), if the slope is changed, the change before and after the change point becomes steep, and therefore, the feeling of the operation to specify a distance becomes unnatural. Consequently, in the present embodiment, the position (rotation angle) of the distance ring 51 (RF distance ring) is divided into small sections and the slope is set for each section. Because of this, it is possible to connect the line smoothly and the feeling of the operation to specify a distance becomes natural.

For example, in the example illustrated in FIG. 3B, in the state where the focal length is on the wide angle side (the shortest focus side wide) and the distance ring 51 (RF distance ring) is set to 0.15 m (the distance specified is 0.15 m), if the focal length is changed to the telephoto side (the longest focus side tele), the distance specified in the RF mode is changed to 0.45 m. Further, on the contrary, in the state where the focal length is on the telephoto side (the longest focus side tele) and the distance ring 51 (RF distance ring) is set to 0.15 m (the distance specified is 0.45 m), if the focal length is changed to the wide angle side (the shortest focus side wide), the distance specified in the RF mode is changed to 0.15 m and the focus lens is moved to the position where the focus position corresponds to the photographing distance 0.15 m.

Further, in the example illustrated in FIG. 3B, in the state where the focal length is on the wide angle side (the shortest focus side wide) and the distance ring 51 (RF distance ring) is set at the intermediate distance L between 0.15 m and 0.45 m, in the RF mode, the intermediate distance L is specified. If the focal length is changed to the telephoto side (the longest focus side tele) from this state, the distance specified in the RF mode is changed to 0.45 m. Further, on the contrary, in the state where the focal length is on the telephoto side (the longest focus side tele) and the distance ring 51 (RF distance ring) is set at the intermediate distance L between 0.15 m and 0.45 m, the distance specified in the RF mode is 0.45 m. If the focal length is changed to the wide angle side (the shortest focus side wide) from this state, the distance specified in the RF mode is changed to the intermediate distance L between 0.15 m and 0.45 m.

Next, an outline of focusing of the focus lens at the time of the RF mode setting in the present embodiment will be explained.

(i) First, the AD value of the RF linear encoder is acquired.

When the distance ring 51 is slid in the optical axis direction and set to the RF mode, an RF linear encoder value from the linear encoder RF position detection section 81 is input to the A/D converter 43 (see S1 in FIG. 5A).

(ii) Next, from the AD-inverse of photographing distance (1/L) table, the inverse of the photographing distance is calculated.

The AD-inverse of photographing distance (1/L) table is stored in the storage section 37. By using the AD value acquired in (i) described above, the inverse of the photographing distance (1/L) is read from the table (see S11 in FIG. 5B).

FIG. 4 is a graph representing the characteristics of both stored in the AD-inverse of photographing distance (1/L) table. In FIG. 4, the horizontal axis represents the AD value indicating the position of the distance ring 51 (RF distance ring) and the vertical axis represents the inverse of the photographing distance (1/L). Adj_AD_far on the horizontal axis is an AD-converted value of the RF linear encoder value when the distance ring 51 is set at the infinity side and Adj indicates that the value is an adjusted value. Further, Adj_AD_near is an AD-converted value of the RF linear encoder value when the distance ring 51 is set at the near side. Furthermore, the AD value represented on the horizontal axis indicates each AD value when the portion between the infinity end and the near end is equally divided.

That is, the graph illustrated in FIG. 4 represents the first relationship X between the rotation angle (RF distance ring position) of the distance ring 51 (RF distance ring) and the value (focus position) relating to the photographing distance corresponding to the first photographing distance area and the second relationship Y between the rotation angle of the distance ring 51 (RF distance ring) and the value relating to the photographing distance corresponding to the second photographing distance area on the shorter distance side than the first photographing distance area. These relationships are stored in the storage section 37 as the AD-inverse of photographing distance (1/L) table.

When the AD-inverse of photographing distance (1/L) table is created, a negative value is secured as the inverse of the photographing distance (1/L) on the ∞ side so that the optical ∞ can be secured without fail. Further, at the optical ∞ position, 1/L becomes 1/∞, and therefore, becomes 0 (see P1). In the example illustrated in FIG. 4, the optical ∞ is P1 and the inverse of the photographing distance (1/L) is 0. In this table, a value is provided also on the side (infinity side) farther than the optical ∞ (see P0) and is −2 in this example.

Further, in the AD-inverse of photographing distance (1/L) table, as the 1/L on the near side, a value on the side farther than the shortest photographing distance is provided so that the optical short distance can be secured. In the example illustrated in FIG. 4, a value larger than the shortest photographing distance (see P2) 1/0.15 m=6.67 is prepared.

In the AD-inverse of photographing distance (1/L) table, the inverse of the photographing distance (1/L) is stored discretely in correspondence to each AD value. In the example illustrated in FIG. 4, in correspondence to the AD value corresponding to a white circle, the inverse of the photographing distance (1/L) is stored. Between AD values, the inverse of the photographing distance (1/L) is obtained by linear interpolation.

(iii) From the inverse of the photographing distance (1/L), an FCENC area (area obtained by dividing the entire area of the inverse of the photographing distance (1/L) into a plurality of areas) is calculated.

(iv) From FCENC and Trac-ZMENC, the target position Pls (focus pulse) is calculated.

In (iii) and (iv), when the inverse of the photographing distance (1/L) is obtained first, on the AD-inverse of photographing distance (1/L) table, the area in which the obtained 1/L is included is calculated (FCENC area). When the FCENC area is obtained, next, by using the FCENC area and a focal length ZMENC currently set, the position of the focus lens (target position Pls (focus pulse)) is obtained. Note that the position of the focus lens (target position Pls) in accordance with the FCENC area and the focal length ZMENC is stored in the storage section 37 in the form of a table. The processing in (iii) and (iv) is described in Patent Literature 1, and therefore, detailed explanation is omitted.

(v) Shortest photographing distance rounding processing is performed.

The storage section 37 stores an optical near pulse table indicating the optical short distance for each focal length. As described previously, the position of the focus lens 11b is detected based on the number of pulses (Pls number) applied to the actuator (stepping motor is used) for a focus lens by taking the reference position detected by the focus lens reference position detection section 27 as a reference. The optical near pulse is indicated by this Pls (see S17 in FIG. 5B).

For the position of the focus lens (target position Pls) obtained in (iii) and (iv) described above, in the case where the position of the focus lens is on the nearer side than the optical near pulse stored in the optical near pulse table, the target position Pls is rounded. That is, in the case where the position of the focus lens is on the longer distance side than the optical near pulse, the calculated focus lens position (target position Pls) is used as it is. On the other hand, in the case where the position of the focus lens is on the shorter distance side than the optical near pulse, the optical near pulse stored in the optical near pulse table is used.

Figure 5C:
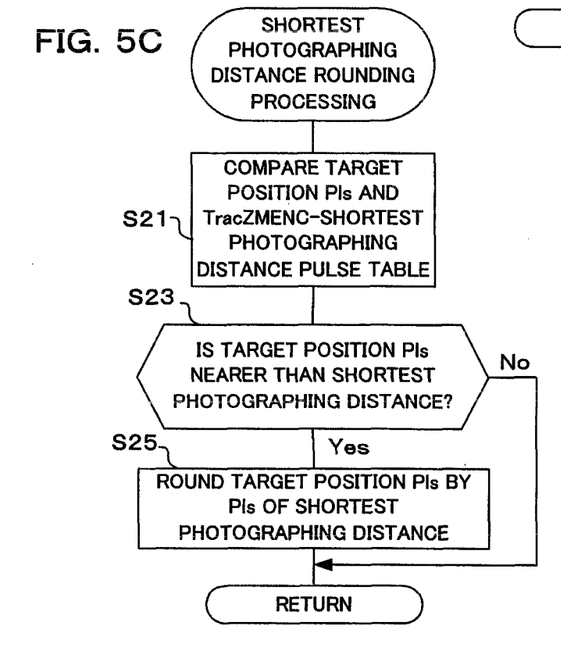

Next, by using flowcharts illustrated in FIG. 5A to FIG. 5C, the operation of the focusing at the time of the RF mode setting in the present embodiment will be explained. These flowcharts are performed by the CPU 41 controlling each section within the interchangeable lens 100 according to programs stored in the storage section 37.

When the general flow of the RF driving period processing illustrated in FIG. 5A is started, first, AD updating of the RF linear encoder is performed (S1). At the time of the RF mode setting, the A/D converter 43 AD-converts the analog detection signal (RF linear encoder value) in accordance with the absolute position (absolute rotation position) of the distance ring 51 that is output from the linear encoder RF position detection section 81. This AD conversion processing is performed at predetermined time intervals (every RF driving period).

When AD updating of the RF linear encoder is performed, next, data acquisition of a ZM encoder is performed (S3). Here, the A/C converter 44 AD-converts the analog detection signal (ZM linear encoder value) output by the linear encoder ZM position detection section 82 and obtains the AD-converted value (ZMENC) corresponding to the currently set focal length.

Next, the target position Pls is calculated (S5). Here, based on the AD-converted value of the RF linear encoder, the target position Pls to move the focus lens to the photographing distance in accordance with the absolute position of the distance ring 51 is calculated. The detailed operation of the target position Pls calculation will be described later by using the flowchart illustrated in FIG. 5B.

When the calculation of the target position Pls is performed, next, the focus lens (FCS) is driven (S7). Here, the number of pulses based on the target position Pls obtained at step S5 is applied to the lens driving motor LDMT 73. Due to this, it is possible for the focus lens to set focus at the photographing distance set by the distance ring 51. After this processing is performed, the processing is returned to the first step.

Next, by using the flowchart illustrated in FIG. 5B, the target position Pls calculation at step S5 will be explained. Note that the processing at steps S11 to S15 is explained in Patent Literature 1, in particular in relation to the flowchart illustrated in FIG. 16, and therefore, only its outline is explained.

When this flow is entered, first, the photographing distance 1/L is calculated from an AD value-photographing distance 1/L table (S11). Here, by using the AD-photographing distance (1/L) table stored in the storage section 37, the inverse of the photographing distance corresponding to the AD value of the RF linear encoder acquired at step S1 is obtained. As described previously by using FIGS. 3A and 3B and FIG. 4, the relationship between the rotation angle of the distance ring 51 and the photographing distance is made to differ between the case where the photographing distance specified by the distance ring 51 is on the short distance side and the case where that is on the long distance side.

When the inverse of the photographing distance (1/L) is obtained at step S11, next, by the obtained 1/L, the FCENC area is calculated (S13). The FCENC area is a value corresponding to 1/L on the table. That is, the value of 1/L is discrete on the table, and therefore, there is a case where the same value as 1/L obtained at step S11 does not exist. Consequently, the area (FCENC area) in which the 1/L obtained at step S11 is included is calculated.

When the FCENC area is obtained, next, by FCENC and Trac_ZMEnc, the target position Pls is calculated (S17). Trac_ZMEnc is a value corresponding to the focal length on the table and a value corresponding to each area obtained by dividing the entire area of ZMENC into a plurality of areas. The AD value-photographing distance 1/L table stores the relationship between the AD value and the inverse of the photographing distance (1/L) in accordance with the focal length. When FCENC corresponding to 1/L and Trac_ZMEnc corresponding to the focal length are determined, it is possible to obtain the target position Pls corresponding to the focus position of the focus lens 11b. Note that, on the table, only the discrete values exist, and therefore, it is sufficient to obtain the target position Pls more accurately by using an interpolation calculation expression.

When the target position Pls is calculated, next, the shortest photographing distance rounding processing is performed (S17). Here, as explained in (v) described previously, in the case where the target position Pls of the focus lens calculated at step S15 is on the longer distance side than the shortest photographing distance, the calculated target position Pls of the focus lens is used as it is. On the other hand, in the case where the target position Pls of the focus lens is on the shorter distance side than the shortest photographing distance, the optical near pulse stored in the table is used as the target position Pls. This shortest photographing distance rounding processing will be described later by using FIG. 5C. When the shortest photographing distance rounding processing is performed, the processing returns to the original flow and the focus lens is moved to the target position Pls.

Next, by using the flowchart illustrated in FIG. 5C, the shortest photographing distance rounding processing at step S17 will be explained. When the flow in FIG. 5C is entered, first, the target position Pls and a TracZMENC-shortest photographing distance pulse table are compared (S21). The TracZMENC-shortest photographing distance pulse table stores the shortest photographing distance in the form of a table for each focal length and is stored in the storage section 37. At this step, the shortest photographing distance in accordance with the current focal length (ZMENC) detected at step S3 is read from the table and the read shortest photographing distance and the target position Pls obtained at step S15 are compared.

Following this, whether or not the target position Pls is on the nearer side than the shortest photographing distance is determined (S23). Here, determination is performed based on the results of the comparison at step S21. In the case where the results of the determination are No, that is, in the case where the target position Pls is more distant than the shortest photographing distance, the processing returns to the original flow without changing the target position Pls.

On the other hand, in the case where the results of the determination at step S23 are Yes, that is, in the case where the target position Pls is on the nearer side than the shortest photographing distance, the target position Pls is rounded by Pls of the shortest photographing distance (S25). Here, the target position Pls is on the nearer side than the shortest photographing distance, and therefore, the target position Pls is replaced with the shortest photographing distance (optical near pulse) in accordance with the current focal length read at step S21. When replacement of the target position Pls is performed, the processing returns to the original flow.

As described above, in an embodiment of the present invention, in the vicinity of the shortest distance at the time when the focal length is set at the longest focal length, the slope of the line indicating the relationship between the position (rotation angle) of the distance ring 51 (RF distance ring) to specify a photographing distance and the focus position of the focus lens is changed. Because of this, even in the case of a photographing lens whose shortest photographing distance changes, it is possible to secure favorable operability without giving a photographer a feeling of unnaturalness.

Next, as to the relationship between the RF distance ring and the focus position according to the present embodiment in FIG. 3B, modification examples of the present embodiment will be explained by using FIG. 6 to FIG. 8.

Figure 6:
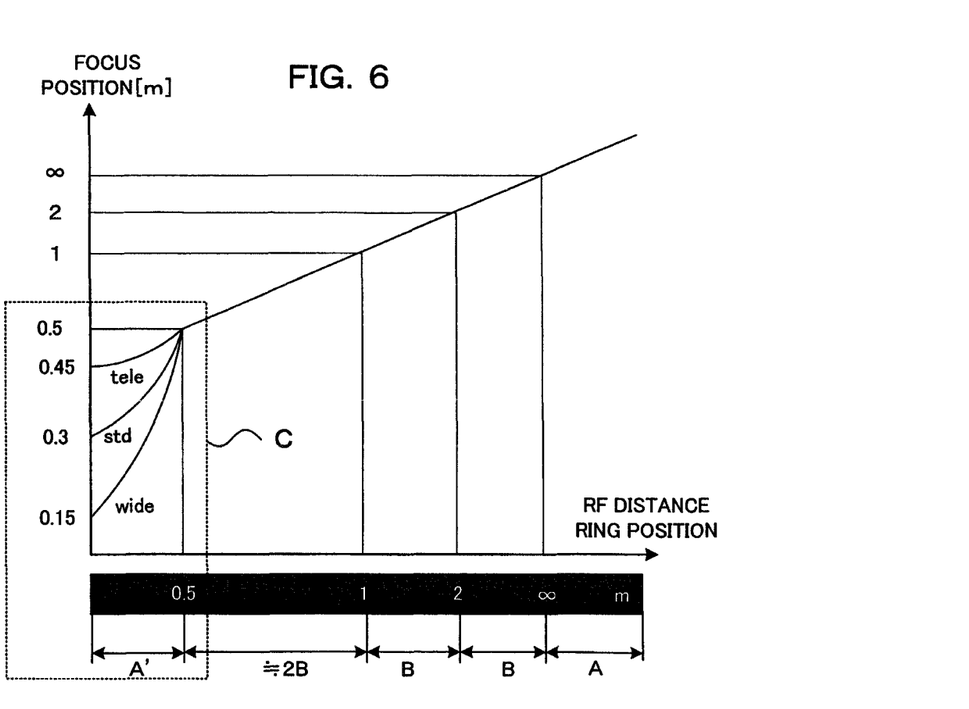
FIG. 6 is a graph representing a relationship between a rotation position of a distance ring and a focus position of a focus lens in a camera according to a first modification example of an embodiment of the present invention.

FIG. 6 illustrates a first modification example. In the present modification example, in the area (see dotted line frame C) in which the shortest photographing distance changes as the focal length changes, the positions of the distance scale and the optical distance (target position Pls) are changed. For example, by the focal length, the positions are changed as illustrated in FIG. 6. In the example illustrated in FIG. 6, a predetermined distance (0.5 m) near to the shortest photographing distance (0.45 m) at the longest focal length (tele) is fixed. Then, the relationship between the distance scale and the optical distance (target position Pls) is determined so that the fixed distance and the shortest distance that is different for each focal length are connected. Note that, in FIG. 6, the longest focal length is indicated by tele, the shortest focal length is indicated by wide, and an intermediate focal length is indicated by std.

According to the first modification example, when the distance ring 51 (RF distance ring) is operated up to the end, the shortest photographing distance position of the focal length position (ZM position) is reached. That is, irrespective of the focal length, it is possible to perform the rotation operation of the distance ring 51 up to the end and when the end is reached, the shortest photographing distance is obtained. Because of this, the feeling of operation becomes natural.

Figure 7:
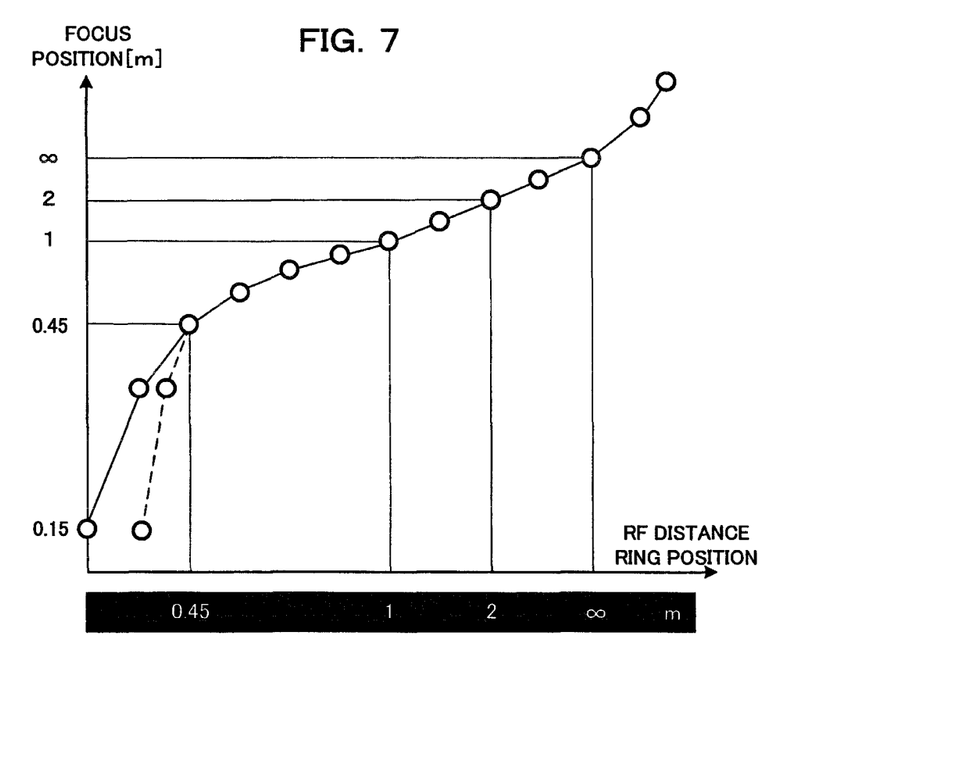
FIG. 7 is a graph representing a relationship between a rotation position of a distance ring and a focus position of a focus lens in a camera according to a second modification example of an embodiment of the present invention.

FIG. 7 illustrates a second modification example. In the present modification example, when the diaphragm is made small by a diaphragm preview or the like, the depth is deep, and therefore, the slope of the line that determines the relationship between the distance scale and the optical length (target position Pls) is increased. In FIG. 7, in the case where the diaphragm is not made small (in the case where the diaphragm is fully opened), the relationship is indicated by the solid line on the side where the position of the distance ring 51 (RF distance ring) is nearer than 0.45 m. When the diaphragm is made small, the relationship is indicated by the broken line on the side where the position is nearer than 0.45 m.

According to the present modification example, the rotation operation of the distance ring 51 (RF distance ring) is one that takes into consideration the depth of field. That is, in the case where the depth of field is deep, the change in the focus is small even if the focus lens is moved considerably. Consequently, in the cases of the shortest focal length, the position (position of the 0 mark indicated by the broken line) where the depth of field is entered at 0.15 m is caused to correspond to 0.15 m of the distance ring 51 and the amount of movement of the distance ring 51 (RF distance ring) until the shortest photographing distance is reached is reduced. In this manner, it is possible to reduce the change in the amount of movement of the distance ring 51 until the shortest photographing distance is reached due to the change in the focal length, and therefore, the feeling of operation becomes more natural.

Figure 8:
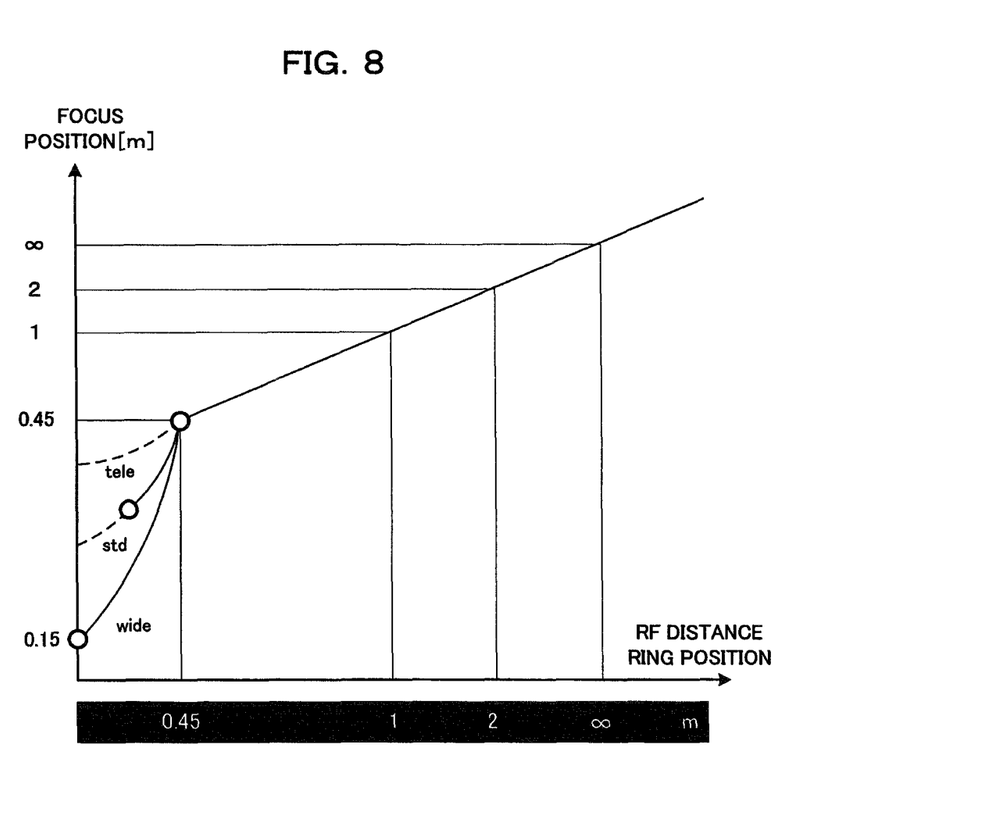
FIG. 8 is a graph representing a relationship between a rotation position of a distance ring and a focus position of a focus lens in a camera according to a third modification example of an embodiment of the present invention.

FIG. 8 illustrates a third modification example. In the present modification example, the slope of the line that determines the relationship between the distance scale and the optical distance (target position Pls) and the range in which the target position Pls is driven are switched depending on the focal length. The slope of the line is changed by taking into consideration the depth of field, the F number, and so on. Further, the driving range of the target position Pls is changed by the shortest photographing distance. In the example illustrated in FIG. 8, as in the first modification example, the position of the shortest photographing distance (0.45 m) at the longest focal length (tele) is fixed. Then, the relationship between the distance scale and the optical distance (target position Pls) is determined so that the fixed distance and the shortest distance that is different for each focal length are connected.

In the example in FIG. 8, in the case where the focal length is the longest focal length (tele), it is not possible to specify a distance on the nearer side than the shortest photographing distance (0.45 m) even by performing the rotation operation of the distance ring 51 (RF distance ring) and the position of the focus lens remains the position corresponding to 0.45 m. Further, in the case where the focal length is the shortest focal length (wide), as in the first modification example, by performing the rotation operation between 0.45 m and the shortest photographing distance (0.15 m), it is possible to specify a distance therebetween. The difference from the first modification example lies in that in the case where the focal length is an intermediate focal length (for example, std), it is possible to specify a distance between 0.45 m and the shortest photographing distance (distance of the o marks connected by the solid line) that is set in accordance with the depth of field and F number. Further, it is not possible to specify a distance on the nearer side than this even by performing the rotation operation.

According to the present modification example, in the state where the shortest distance is an intermediate distance (for example, intermediate focal length) in the change range, the rotation operation range of the distance ring 51 (RF distance ring) and the slope are changed by taking into consideration the change in the depth of field and the range of movement up to the shortest distance, and therefore, the feeling of operation becomes more natural.

As explained above, in an embodiment and the modification examples of the present invention, in the storage section 37, the first relationship X between the rotation angle of the distance ring 51 (RF distance ring) and the value relating to the photographing distance corresponding to the first photographing distance area and the second relationship Y between the rotation angle of the distance ring 51 (RF distance ring) and the value relating to the photographing distance corresponding to the second photographing distance area on the shorter distance side than the first photographing distance area are stored (for example, see FIG. 3B, FIG. 4 and FIG. 6 to FIG. 8). Then, the rotation angle of the distance ring 51 (RF distance ring) is detected (for example, see S1 in FIG. 5A), the first relationship X or the second relationship Y is selected in accordance with the rotation angle of the distance ring 51 (RF distance ring), the value relating to the photographing distance in accordance with the rotation angle of the distance ring 51 (RF distance ring) is calculated (for example, S11 to S15 in FIG. 5B), and the position in the optical axis direction of the focus lens 11b is controlled (for example, S7 in FIG. 5A). Because of this, even in the case of a photographing lens whose shortest photographing distance changes, it is possible to secure favorable operability without giving a photographer a feeling of unnaturalness.

Further, in an embodiment and the modification examples of the present invention, in the second relationship Y, the amount of change in the value relating to the photographing distance to the rotation angle of the distance ring 51 (RF distance ring) is made larger than that in the first relationship X (for example, see the shorter distance side than 0.45 m in FIG. 3B). Because of this, it is possible to prevent the indication intervals of the photographing distance from becoming wide on the short distance side and to dispose the indications in a balanced manner.

Further, in an embodiment and the modification examples of the present invention, the zoom position detection section 34 that detects the zoom position of the zoom lens group is provided and in accordance with the detected zoom position, the second relationship is made to differ (for example, see FIG. 3A and FIG. 6 to FIG. 8). Because of this, even in the case of a zoom lens, it is possible to eliminate the trouble in (a) to (c) described above.

Further, in an embodiment and the modification examples of the present invention, in the plurality of the second relationships, the shortest distance at which the focusing by the focusing lens is possible is made to differ in accordance with the zoom position. That is, even in the case where the shortest distance is different depending on the focal length, the second relationship is made to differ in accordance with the focal length. Because of this, even in the case where the shortest distance is different depending on the focal length, it is possible to eliminate the trouble in (a) to (c) described above.

Further, in an embodiment and the modification examples of the present invention, the lens barrel is provided with indications of the photographing distance disposed in accordance with the indexes provided to the distance ring 51 (RF distance ring) (for example, see FIG. 3B). In the present embodiment and the like, instead of the indication intervals that establish a relationship in which the inverse of the distance becomes linear, the indication intervals of the photographing distance are set so as to satisfy the first and second relationships. Because of this, the indication intervals on the short distance side do not become wide and the indication intervals are those that maintain balance on the whole.

Note that, in an embodiment and the modification examples of the present invention, the example is explained in which the embodiment and the modification examples are applied to a zoom lens, but of course it is also possible to apply the embodiment and the modification examples to a single-focus lens. Further, the absolute position of the distance ring 51 at the time of the RF mode setting is obtained by AD-converting the encoder output, but this is not limited and it may also be possible to detect the absolute position by counting the number of pulses after having passed a reference position.

Further, in an embodiment and the modification examples of the present invention, the controller is implemented by the CPU 41, but it may also be possible to implement the controller by making use of a hardware configuration of a gate circuit or the like generated based on a programming language described in Verilog other than a CPU or in addition to a CPU, or to make use of a hardware configuration that uses software, such as a DSP (Digital Signal Processor). It is needless to say that these may be combined appropriately.

Further, in the present embodiments, explanation is given by using a digital camera as a device for photographing, but as a camera, a digital single-lens reflex camera, a mirrorless camera, or a compact digital camera may be used, and a camera for a moving image, such as a video camera and a movie camera, may be used, and further, a camera incorporated in a mobile phone, a smart phone, a mobile information terminal, a personal computer (PC), a tablet-type computer, and a gameing device or the like may be used. In any case, it is possible to apply the present invention to a device that sets focus at a specified distance.

Also, among the technology that has been described in this specification, with respect to control that has been described mainly using flowcharts, there are many instances where setting is possible using programs, and such programs maybe held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' component, 'element,' 'module,' device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A lens control apparatus comprising:
   a focusing lens capable of moving in an optical axis direction provided within a lens barrel including a photographing lens;
   a ring rotatably disposed to the lens barrel within an angle range between a first end point and a second end point;
   a memory that stores a first relationship between a rotation angle of the ring and a value relating to a photographing distance corresponding to a first photographing distance area and a second relationship between a rotation angle of the ring and a value relating to a photographing distance corresponding to a second photographing distance area on a shorter distance side than the first photographing distance area;
   a rotation angle detector that detects a rotation angle of the ring; and
   a controller that controls a position in an optical axis direction of the focusing lens by selecting the first relationship or the second relationship in accordance with a rotation angle of the ring detected by the rotation angle detector and calculating a value relating to a photographing distance in accordance with a rotation angle of the ring.

2. The lens control apparatus according to claim 1, wherein in the second relationship, an amount of change in a value relating to a photographing distance to a rotation angle of the ring is larger than that in the first relationship.

3. The lens control apparatus according to claim 1, comprising:
   a zoom position detector that detects a zoom position of a zoom lens group which is provided within the lens barrel,
   wherein the memory stores a plurality of the second relationships in accordance with the zoom position.

4. The lens control apparatus according to claim 3, wherein in a plurality of the second relationships, a shortest distance at which focusing by the focusing lens is possible is different depending on the zoom position.

5. The lens control apparatus according to claim 1, wherein the lens barrel is provided with photographing distance indications disposed corresponding to indexes provided on the ring.

6. The lens control apparatus according to claim 1, further comprising:
   a ring position switch mechanism that switches the ring to a plurality of positions in an optical axis direction,
   wherein in a case where the ring is set at a predetermined position by the ring position switch mechanism, control by the controller is executed.

7. The lens control apparatus according to claim 1, further comprising:
   a ring position switch mechanism that switches a control mode of performing control in accordance with a relative rotation position of the ring and a control mode of performing control in accordance with an absolute rotation position of the ring according to a plurality of positions in an optical axis direction,
   wherein the controller performs the control in a case where the control mode of performing control in accordance with an absolute rotation position of the ring is selected.

8. A lens control method of an imaging device having a focusing lens capable of moving in an optical axis direction provided within a lens barrel including a photographing lens, a ring rotatably disposed to the lens barrel within an angle range between a first end point and a second end point, a memory that stores a first relationship between a rotation angle of the ring and a value relating to a photographing distance corresponding to a first photographing distance area and a second relationship between a rotation angle of the ring and a value relating to a photographing distance corresponding to a second photographing distance area on a shorter distance side than the first photographing distance area, the lens control method comprising:

detecting a rotation angle of the ring; and controlling a position in an optical axis direction of the focusing lens by selecting the first relationship or second relationship in accordance with a rotation angle of the ring and calculating a value relating to a photographing distance in accordance with a rotation angle of the ring.

9. The lens control method according to claim 8, wherein in the second relationship, an amount of change in a value relating to a photographing distance to a rotation angle of the ring is larger than that in the first relationship.

10. The lens control method according to claim 8, wherein in the second relationship, a shortest distance at which focusing by the focusing lens is possible is different depending on the zoom position.

11. The lens control method according to claim 8, comprising:

switching the ring to a plurality of positions in an optical axis direction; and     executing control of a position in an optical axis direction of the focusing lens in a case where the ring is set at a predetermined position.

12. The lens control method according to claim 8, comprising:

switching a control mode of performing control in accordance with a relative rotation position of the ring and a control mode of performing control in accordance with an absolute rotation position of the ring according to a plurality of positions in an optical axis direction; and     executing control of a position in an optical axis direction of the focusing lens in a case where the control mode of performing control in accordance with an absolute rotation position of the ring is selected.

* * * * *